United States Patent
Liu et al.

(10) Patent No.: US 8,591,054 B2
(45) Date of Patent: Nov. 26, 2013

(54) DISPLAY DEVICE

(75) Inventors: Yun-I Liu, Hsin-Chu (TW); Chen-Hsien Liao, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 143 days.

(21) Appl. No.: 12/971,144

(22) Filed: Dec. 17, 2010

(65) Prior Publication Data

US 2011/0157871 A1    Jun. 30, 2011

(30) Foreign Application Priority Data

Dec. 30, 2009   (TW) ............................... 98145970 A

(51) Int. Cl.
*G09F 13/04* (2006.01)
*G09F 13/08* (2006.01)

(52) U.S. Cl.
USPC ............. 362/97.2; 362/84; 362/601; 362/606

(58) Field of Classification Search
USPC ......... 362/84, 97.1–97.4, 601, 606–608, 618, 362/622, 627; 349/71
See application file for complete search history.

(56) References Cited

U.S. PATENT DOCUMENTS

2008/0151154 A1* 6/2008 Chen ............................. 349/106
2010/0128202 A1  5/2010 Chu Ke et al.

FOREIGN PATENT DOCUMENTS

CN    200910009761    7/2009
TW    I286242    9/2007

OTHER PUBLICATIONS

Taiwan Office Action dated Nov. 23, 2012.
English translation of abstract of TW I286242 (published Sep. 1, 2007).
English translation of abstract of CN 200910009761 (published Jul. 8, 2009).

* cited by examiner

*Primary Examiner* — Jason Moon Han
(74) *Attorney, Agent, or Firm* — McClure, Qualey & Rodack, LLP

(57) ABSTRACT

A display device and a manufacturing method thereof are provided. The display device includes a backlight module and a color resist layer. The backlight module generates an output light, wherein the output light has an emitting spectrum function $BL(\lambda)$ corresponding to a wave length $\lambda$. The color resist layer has a blue resist unit, a green resist unit, a red resist unit, and a white resist unit, respectively formed on the backlight module, for filtering the output light generated by the backlight module. The color resist layer has an index function $S(\lambda)$. The index function $S(\lambda)$ has an interval maximum value in the wave length between 480 nm and 580 nm, wherein the interval maximum value is between 1.1 and 1.2. The manufacturing method includes providing a backlight module to generate an output light; selecting a blue resist unit, a green resist unit, a red resist unit, and a white resist unit in accordance with an index function $S(\lambda)$; and combining the blue resist unit, the green resist unit, the red resist unit, and the white resist unit together to form a color resist layer on the backlight module for filtering the output light emitted by the backlight module.

4 Claims, 3 Drawing Sheets

DISPLAY DEVICE

BACKGROUND OF THE INVENTION

1. Field of the Invention

This invention generally relates to a display device and a manufacturing method thereof. More particularly, this invention relates to a LCD display device and a manufacturing method thereof.

2. Description of the Prior Art

In general, the color filter of the LCD display includes a substrate, a spacer, a red filter film, a green filter film, and a blue filter film. In order to increase the brightness and color saturation to obtain a better visual effect, the development of multi-color filter has become one of important issues in the current trend. The RGBW multi-color technology which increases the brightness and saves the energy is followed with most interest.

One of the key points in developing RGBW multi-color technology is to increase the transmittance of a light passing through the display panel to save energy. However, a white resist unit will turn yellow after a high temperature process, causing the difference between the location of the W white point and the location of RGB-color-mixed white point so large to affect the transformation of the signal. More particularly, in the calculation of transforming RGB into RGBW, a W signal is taken from a RBB signal. Inaccuracy in calculation will occur to affect the transformation of the signal and cause a color-deviation if the difference between the location of the W white point and the location of RGB-color-mixed white point is too large. To solve this problem, prior arts often increase the aperture ratio of blue resist unit and decrease the aperture ratio of the white resist unit, which, however, decreases the overall transmittance.

SUMMARY OF THE INVENTION

It is an object of the present invention to provide a display device to reduce color-deviation.

It is another object of the present invention to provide a display device manufacturing method to reduce color-deviation.

The display device includes a backlight module and a color resist layer. The backlight module generates an output light, wherein the output light has an emitting spectrum function $BL(\lambda)$ corresponding to a wave length $\lambda$. The color resist layer has a blue resist unit, a green resist unit, a red resist unit, and a white resist unit, respectively formed on the backlight module, for filtering the output light generated by the backlight module. With respect to the wave length $\lambda$, the blue resist unit has a blue light transmission spectrum function $B(\lambda)$, the green resist unit has a green light transmission spectrum function $G(\lambda)$, the red resist unit has a red light transmission spectrum function $R(\lambda)$, and the white resist unit has a white light transmission spectrum function $W(\lambda)$. The color resist layer has an index function $S(\lambda)$ given as:

$$S(\lambda) = \frac{R(\lambda)*BL(\lambda) + G(\lambda)*BL(\lambda) + B(\lambda)*BL(\lambda)}{W(\lambda)*BL(\lambda)},$$

wherein 380 nm<$\lambda$<780 nm;
The index function $S(\lambda)$ has an interval maximum value in the wave length between 480 nm and 580 nm, wherein the maximum value is between 1.1 and 1.2.

The blue light transmission spectrum function $B(\lambda)$ has a local maximum transmittance in the wave length between 380 nm and 580 nm. The red light transmission spectrum function $R(\lambda)$ has a local maximum transmittance in the wave length between 580 nm and 780 nm. The local maximum transmittance of red light is higher than the local maximum transmittance of blue light. The green light transmission spectrum function $G(\lambda)$ has a local maximum transmittance in the wave length between 480 nm and 680 nm. The local maximum transmittance of green light is higher than the local maximum transmittance of blue light. The blue light transmission spectrum function $B(\lambda)$, the green light transmission spectrum function $G(\lambda)$, the red light transmission spectrum function $R(\lambda)$, and the white light transmission spectrum function $W(\lambda)$ are respectively expressed in transmittance.

The manufacturing method of the present invention includes the following steps: providing a backlight module to generate an output light, wherein the output light has an emitting spectrum function $BL(\lambda)$ corresponding to a wave length $\lambda$; selecting a blue resist unit, a green resist unit, a red resist unit, and a white resist unit in accordance with an index function $S(\lambda)$, wherein with respect to the wave length $\lambda$, the blue resist unit has a blue light transmission spectrum function $B(\lambda)$, the green resist unit has a green light transmission spectrum function $G(\lambda)$, the red resist unit has a red light transmission spectrum function $R(\lambda)$, the white resist unit has a white light transmission spectrum function $W(\lambda)$, wherein $$S(\lambda) = \frac{R(\lambda)*BL(\lambda) + G(\lambda)*BL(\lambda) + B(\lambda)*BL(\lambda)}{W(\lambda)*BL(\lambda)},$$

380 nm<$\lambda$<780 nm; and combining the blue resist unit, the green resist unit, the red resist unit, and the white resist unit together to form a color resist layer on the backlight module for filtering the output light emitted by the backlight module.

The resist unit selecting step includes making the index function $S(\lambda)$ have an interval maximum value in the wave length between 480 nm and 580 nm, wherein the maximum value is between 1.1 and 1.2. The blue light transmission spectrum function $B(\lambda)$ has a local maximum transmittance in the wave length between 380 nm and 580 nm, the red light transmission spectrum function $R(\lambda)$ has a local maximum transmittance in the wave length between 580 nm and 780 nm, the resist unit selecting step includes making the local maximum transmittance of red light be higher than the local maximum transmittance of blue light. The blue light transmission spectrum function $B(\lambda)$ has a local maximum transmittance in the wave length between 380 nm and 580 nm, the green light transmission spectrum function $G(\lambda)$ has a local maximum transmittance in the wave length between 480 nm and 680 nm, the resist unit selecting step includes making the local maximum transmittance of green light be higher than the local maximum transmittance of blue light.

The resist unit selecting step includes determining the red resist unit and the green resist unit and changing the material, the thickness, or the proportion of a plurality of materials of the blue resist unit to adjust the index function $S(\lambda)$.

DETAILED DESCRIPTION OF THE PREFERRED EMBODIMENT

Figure 3:
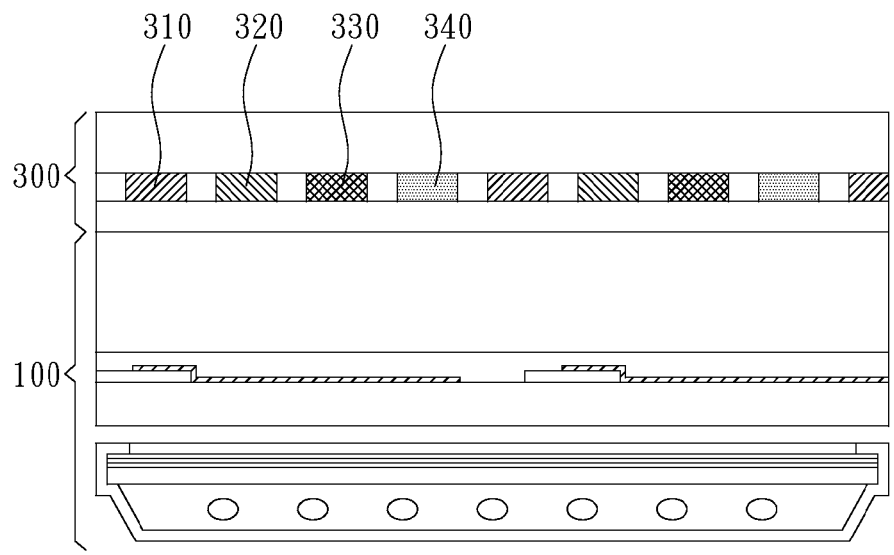
FIG. 3 is a schematic view of the preferred embodiment of the display device of the present invention.

The display device 800, as shown in FIG. 3, includes a backlight module 100 and a color resist layer 300. The backlight module 100 generates an output light, wherein the output light has an emitting spectrum function BL(λ) corresponding to a wave length λ. The color resist layer 300 has a blue resist unit 310, a green resist unit 320, a red resist unit 330, and a white resist unit 340, respectively formed on the backlight module 100, for filtering the output light generated by the backlight module 100. With respect to the wave length λ, the blue resist unit 310 has a blue light transmission spectrum function B(λ), the green resist unit 320 has a green light transmission spectrum function G(λ), the red resist unit 330 has a red light transmission spectrum function R(λ), and the white resist unit 340 has a white light transmission spectrum function W(λ).

Figure 1A:
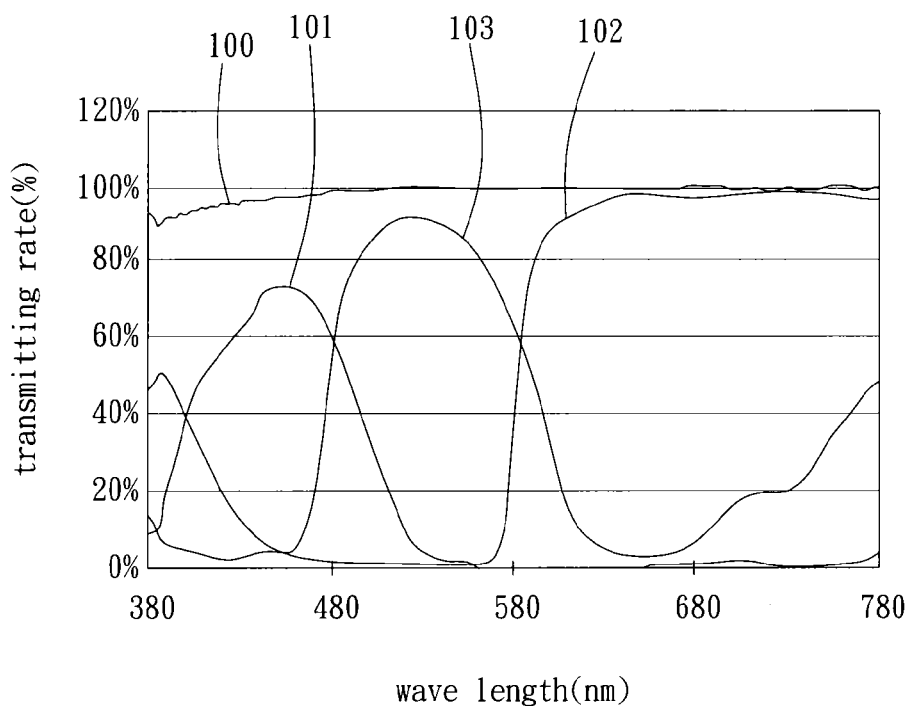
FIG. 1A is a transmission spectrum of the preferred embodiment of the present invention.

As shown in FIG. 1A, a white light transmission spectrum, a blue light transmission spectrum, a red light transmission spectrum, and a green light transmission spectrum are respectively represented as 100, 101, 102, and 103. In a preferred embodiment, the blue light transmission spectrum function B(λ) has a local maximum transmittance in the wave length between 380 nm and 580 nm. The red light transmission spectrum function R(λ) has a local maximum transmittance in the wave length between 580 nm and 780 nm. The green light transmission spectrum function G(λ) has a local maximum transmittance in the wave length between 480 nm and 680 nm. The local maximum transmittance of red light is higher than the local maximum transmittance of blue light. The local maximum transmittance of green light is higher than the local maximum transmittance of the blue light. In the preferred embodiment, the blue light transmission spectrum function B(λ), the green light transmission spectrum function G(λ), the red light transmission spectrum function R(λ), and the white light transmission spectrum function W(λ) are respectively expressed in transmittance. However, in other embodiments, the blue light transmission spectrum function B(λ), the green light transmission spectrum function G(λ), the red light transmission spectrum function R(λ), and the white light transmission spectrum function W(λ) can be expressed in other measurable optical values.

Figure 1B:
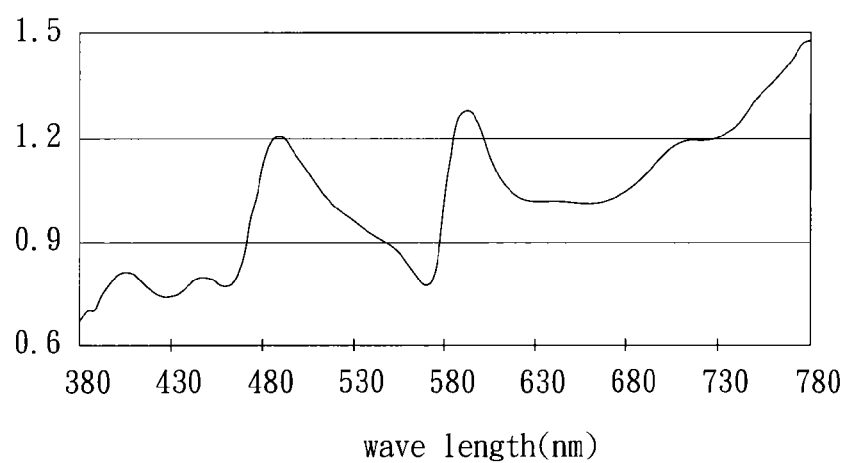
FIG. 1B is a schematic view of the index function $S(\lambda)$.

The color resist layer has an index function S(λ) given below:

$$S(\lambda) = \frac{R(\lambda)*BL(\lambda) + G(\lambda)*BL(\lambda) + B(\lambda)*BL(\lambda)}{W(\lambda)*BL(\lambda)},$$

wherein 380 nm<λ<780 nm. The index function S(λ) has an interval maximum value in the wave length between 480 nm and 580 nm, wherein the interval maximum value is between 1.1 and 1.2. More particularly, as shown in FIG. 1B, the display device of the present invention complying with the index function S(λ) and having an interval maximum value between 1.1 and 1.2 in the wave length between 480 nm and 580 nm has a better white point location, i.e. has less color-deviation.

The color-deviation reducing effect of the present invention can be illustrated in the following four different embodiments.

EMBODIMENT 1

|  | RGBW-W | | RGB-W | | W | | | |
| --- | --- | --- | --- | --- | --- | --- | --- | --- |
|  | x | y | x | y | x | y | λ$_{max}$ | Δu'v' |
| Blue-H | 0.321 | 0.339 | 0.317 | 0.333 | 0.324 | 0.346 | 1.315 | 0.008 |
| Blue-G | 0.322 | 0.341 | 0.320 | 0.335 |  |  | 1.278 | 0.006 |
| Blue-F | 0.323 | 0.342 | 0.322 | 0.338 |  |  | 1.215 | 0.005 |
| Blue-E | 0.325 | 0.344 | 0.325 | 0.343 |  |  | 1.192 | 0.002 |
| Blue-D | 0.326 | 0.345 | 0.326 | 0.344 |  |  | 1.157 | 0.002 |
| Blue-C | 0.327 | 0.347 | 0.329 | 0.349 |  |  | 1.116 | 0.003 |
| Blue-B | 0.328 | 0.349 | 0.333 | 0.353 |  |  | 1.098 | 0.006 |
| Blue-A | 0.329 | 0.351 | 0.336 | 0.358 |  |  | 1.081 | 0.008 |

EMBODIMENT 2

|  | RGBW-W | | RGB-W | | W | | | |
| --- | --- | --- | --- | --- | --- | --- | --- | --- |
|  | x | y | x | y | x | y | λ$_{max}$ | Δu'v' |
| Blue-H | 0.282 | 0.282 | 0.278 | 0.278 | 0.285 | 0.287 | 1.271 | 0.008 |
| Blue-G | 0.283 | 0.284 | 0.281 | 0..281 |  |  | 1.234 | 0.005 |
| Blue-F | 0.284 | 0.285 | 0.283 | 0.283 |  |  | 1.194 | 0.002 |
| Blue-E | 0.286 | 0.287 | 0.286 | 0.286 |  |  | 1.152 | 0.001 |
| Blue-D | 0.287 | 0.288 | 0.288 | 0.288 |  |  | 1.128 | 0.002 |
| Blue-C | 0.288 | 0.290 | 0.289 | 0.291 |  |  | 1.108 | 0.003 |
| Blue-B | 0.289 | 0.293 | 0.291 | 0.294 |  |  | 1.067 | 0.006 |
| Blue-A | 0.291 | 0.295 | 0.294 | 0.299 |  |  | 1.054 | 0.009 |

EMBODIMENT 3

|  | RGBW-W | | RGB-W | | W | | | |
| --- | --- | --- | --- | --- | --- | --- | --- | --- |
|  | x | y | x | y | x | y | λ$_{max}$ | Δu'v' |
| Blue-H | 0.300 | 0.337 | 0.303 | 0.335 | 0.321 | 0.328 | 1.301 | 0.015 |
| Blue-G | 0.316 | 0.329 | 0.310 | 0.330 |  |  | 1.255 | 0.009 |
| Blue-F | 0.317 | 0.330 | 0.313 | 0.331 |  |  | 1.225 | 0.007 |
| Blue-E | 0.319 | 0.331 | 0.318 | 0.330 |  |  | 1.195 | 0.003 |
| Blue-D | 0.320 | 0.332 | 0.318 | 0.329 |  |  | 1.173 | 0.002 |
| Blue-C | 0.321 | 0.333 | 0.319 | 0.331 |  |  | 1.119 | 0.003 |
| Blue-B | 0.322 | 0.334 | 0.321 | 0.333 |  |  | 1.101 | 0.003 |
| Blue-A | 0.324 | 0.336 | 0.325 | 0.339 |  |  | 1.082 | 0.007 |

EMBODIMENT 4

|  | RGBW-W | | RGB-W | | W | | | |
| --- | --- | --- | --- | --- | --- | --- | --- | --- |
|  | x | y | x | y | x | y | λ$_{max}$ | Δu'v' |
| Blue-H | 0.276 | 0.288 | 0.266 | 0.282 | 0.288 | 0.295 | 1.277 | 0.016 |
| Blue-G | 0.286 | 0.291 | 0.284 | 0.287 |  |  | 1.240 | 0.006 |
| Blue-F | 0.287 | 0.293 | 0.287 | 0.292 |  |  | 1.197 | 0.002 |
| Blue-E | 0.289 | 0.294 | 0.290 | 0.294 |  |  | 1.183 | 0.002 |
| Blue-D | 0.290 | 0.296 | 0.291 | 0.296 |  |  | 1.167 | 0.002 |
| Blue-C | 0.291 | 0.297 | 0.292 | 0.298 |  |  | 1.122 | 0.003 |
| Blue-B | 0.291 | 0.298 | 0.294 | 0.301 |  |  | 1.087 | 0.005 |
| Blue-A | 0.292 | 0.300 | 0.297 | 0.306 |  |  | 1.055 | 0.008 |

Δu'v' is an index value of color-deviation, wherein u'=4x/(−2x+12y+3) v'=9y/(−2x+12y+3). More particularly, Δu'v' represents a two dimensional straight line distance between RGB-W and W, wherein smaller Δu'v' indicates less color-deviation. As shown in the above tables of EMBODIMENT 1 to 4, Δu'v' is larger than 0.003 when the interval maximum value is larger than 1.2 or less than 1.1, whereas Δu'v' is less than 0.003 when the interval maximum value is between 1.1 and 1.2. In other words, when the interval maximum value of the index function S(λ) is between 1.1 and 1.2, the display device of the present invention has less color-deviation and a better white point location.

Figure 2:
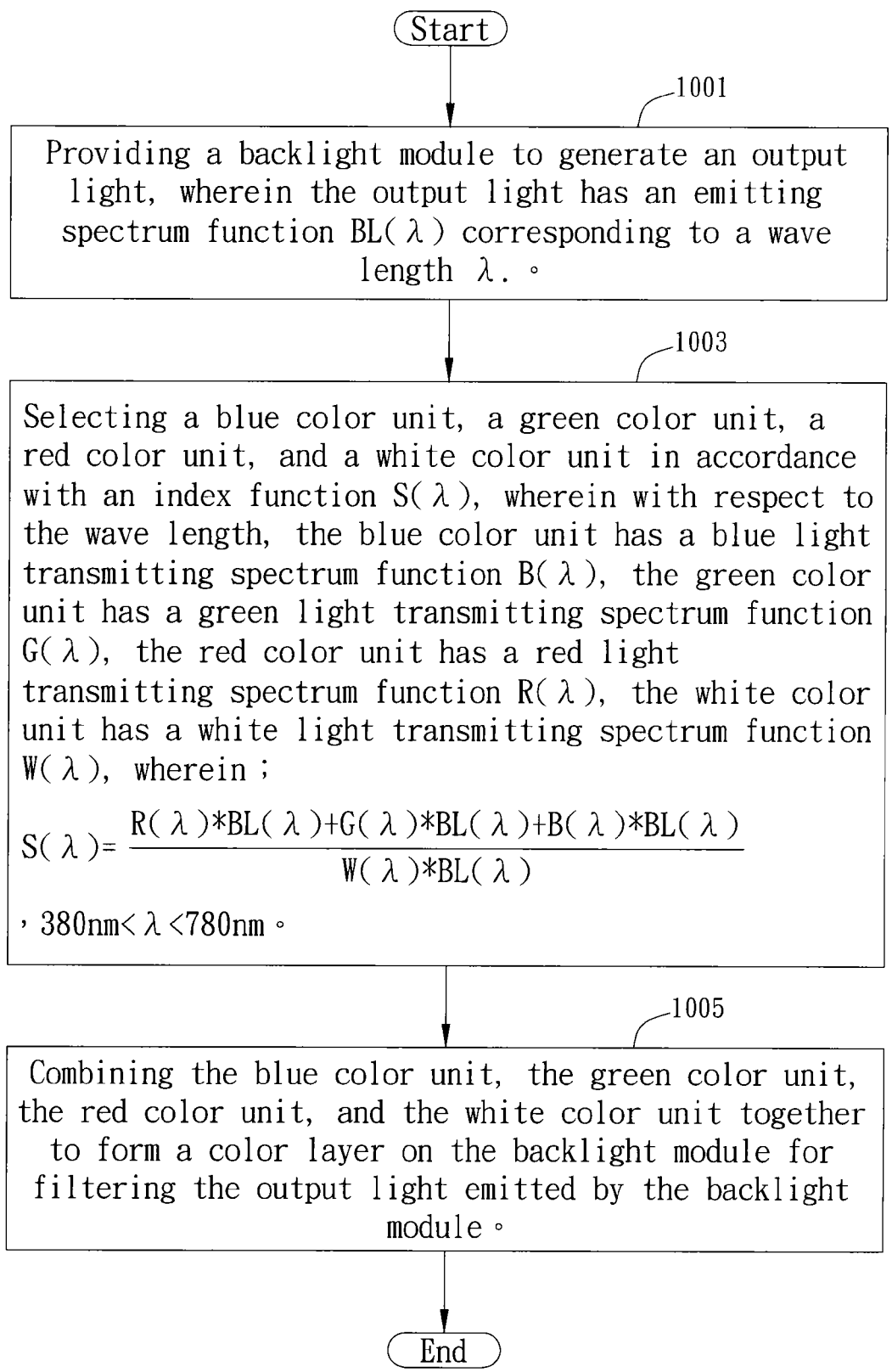
FIG. 2 is a schematic view of the manufacturing method of the preferred embodiment of the present invention.

As shown in FIG. 2, the manufacturing method of the present invention includes the following steps:

Step 1001, providing a backlight module to generate an output light, wherein the output light has an emitting spectrum function BL(λ) corresponding to a wave length λ.

Step 1003, selecting a blue resist unit, a green resist unit, a red resist unit, and a white resist unit in accordance with an index function S(λ), wherein with respect to the wave length λ, the blue resist unit has a blue light transmission spectrum function B(λ), the green resist unit has a green light transmission spectrum function G(λ), the red resist unit has a red light transmission spectrum function R(λ), the white resist unit has a white light transmission spectrum function W(λ). The index function S(λ) is given as:

$$S(\lambda) = \frac{R(\lambda)*BL(\lambda) + G(\lambda)*BL(\lambda) + B(\lambda)*BL(\lambda)}{W(\lambda)*BL(\lambda)},$$

wherein 380 nm<λ<780 nm.

Step 1005, combining the blue resist unit, the green resist unit, the red resist unit, and the white resist unit together to form a color resist layer on the backlight module for filtering the output light emitted by the backlight module.

In the preferred embodiment, step 1003 includes making the index function S(λ) have an interval maximum value in the wave length between 480 nm and 580 nm, wherein the interval maximum value is between 1.1 and 1.2. More particularly, the red resist unit and the green resist unit can be determined at first and then the material, the thickness, or the proportion of a plurality of materials of the blue resist unit is changed to adjust the index function S(λ) to meet the requirement. For example, in the preferred embodiment, a resist unit with a blue-purple ratio of 15:6, a purple no. 23 resist unit, or a resist unit with a blue-purple ratio of 9:1 can be used as the blue resist unit to make the index function S(λ) have an interval maximum value in the wave length between 480 nm and 580 nm, wherein the interval maximum value is between 1.1 and 1.2.

In other embodiments, the blue light transmission spectrum function B(λ) has a local maximum transmittance in the wave length between 380 nm and 580 nm, the red light transmission spectrum function R(λ) has a local maximum transmittance in the wave length between 580 nm and 780 nm, wherein step 1003 includes making the local maximum transmittance of red light be higher than the local maximum transmittance of blue light.

In different embodiments, the blue light transmission spectrum function B(λ) has a local maximum transmittance in the wave length between 380 nm and 580 nm, the green light transmission spectrum function G(λ) has a local maximum transmittance in the wave length between 480 nm and 680 nm, wherein step 1003 includes making the local maximum transmittance of green light be higher than the local maximum transmittance of blue light.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display device, comprising:
a backlight module for generating an output light, wherein the output light has an emitting spectrum function BL(λ) corresponding to a wave length λ; and
a color resist layer having a blue resist unit, a green resist unit, a red resist unit, and a white resist unit, respectively formed on the backlight module, for filtering the output light generated by the backlight module; wherein with respect to the wave length λ, the blue resist unit has a blue light transmission spectrum function B(λ), the green resist unit has a green light transmission spectrum function G(λ), the red resist unit has a red light transmission spectrum function R(λ), the white resist unit has a white light transmission spectrum function W(λ);
wherein the color resist layer has an index function S(λ):

$$S(\lambda) = \frac{R(\lambda)*BL(\lambda) + G(\lambda)*BL(\lambda) + B(\lambda)*BL(\lambda)}{W(\lambda)*BL(\lambda)},$$

wherein 380 nm<λ<780 nm;
wherein the index function S(λ) has an interval maximum value in the wave length between 480 nm and 580 nm, wherein the interval maximum value is between 1.1 and 1.2.

2. The display device of claim 1, wherein the blue light transmission spectrum function B(λ) has a local maximum transmittance in the wave length between 380 nm and 580 nm, the red light transmission spectrum function R(λ) has a local maximum transmittance in the wave length between 580 nm and 780 nm, the local maximum transmittance of red light is higher than the local maximum transmittance of blue light.

3. The display device of claim 1, wherein the blue light transmission spectrum function B(λ) has a local maximum transmittance in the wave length between 380 nm and 580 nm, the green light transmission spectrum function G(λ) has a local maximum transmittance in the wave length between 480 nm and 680 nm, the local maximum transmittance of green light is higher than the local maximum transmittance of blue light.

4. The display device of claim 1, wherein the blue light transmission spectrum function B(λ), the green light transmission spectrum function G(λ), the red light transmission spectrum function R(λ), and the white light transmission spectrum function W(λ) are respectively expressed in transmittance.

\* \* \* \* \*